Dec. 21, 1965    S. LOOSLI    3,224,510
HARVESTER

Original Filed Nov. 20, 1962    2 Sheets-Sheet 1

STANLEY LOOSLI
INVENTOR
HUEBNER & WORREL
ATTORNEYS
BY
Richard M. Worrel

Dec. 21, 1965   S. LOOSLI   3,224,510
HARVESTER
Original Filed Nov. 20, 1962   2 Sheets-Sheet 2

STANLEY LOOSLI
INVENTOR
HUEBNER & WORREL
ATTORNEYS
BY
Richard M. Worrel

United States Patent Office 3,224,510
Patented Dec. 21, 1965

3,224,510
HARVESTER
Stanley Loosli, Ashton, Idaho, assignor of one-half to Herbert A. Huebner, Los Angeles, Calif., and one-half to Richard M. Worrel, Fresno, Calif.
Continuation of abandoned application Ser. No. 239,409, Nov. 20, 1962. This application Sept. 21, 1964, Ser. No. 400,625
7 Claims. (Cl. 171—127)

The present invention relates to harvesters for harvesting plants growing in the soil and more particularly to such a harvester for digging and elevating such plants. The instant application is a continuation of my preceding co-pending application filed November 20, 1962, Serial No. 239,409, entitled "Harvester," which application is now abandoned without prejudice in favor of this application. My preceding application was a continuation-in-part of my initial co-pending application, filed August 21, 1961, Serial No. 132,929, entitled "Digging and Elevating Apparatus for Harvesters," which was abandoned without prejudice in favor of application, Serial No. 239,409.

The plants which the apparatus of the present invention is adapted to harvest are typified by potatoes, beets, onions, lettuce and the like which are usually grown in transversely spaced, longitudinally extended crested rows. During the harvesting of such crops, a relatively wide swath is cut by the harvester as it proceeds through the growing field. Normally, such fields contain irregularities and variations in their contours. If variations in the contour of a field are of a sufficient degree, it is difficult to maintain the digging blade or other means used to uproot the plants at a proper depth throughout the width of the swath. Accordingly, the efficient harvesting of such plants can be performed only by a machine which can harvest over a sufficient swath while still accommodating variations in the contour of the ground traversed. To accomplish this result, certain harvesters have employed a pair of conveyors disposed in side-by-side relationship; however, the spacing between such elevators and structure disposed therebetween have occasioned damage to and the loss of the edible portions of the plants, such as potatoes as well as excessive clogging.

Prior to the present invention, it had been regarded as essential to have conveyor supporting and crop guiding structure at the opposite sides of each conveyor. Thus, it had been impossible to provide a plurality of conveyors which independently could move elevationally in accommodating uneven terrain and yet cooperatively could define an unobstructed path. Such obstructions collect potato vines, soil, debris, and the like which either congest the conveyors or after having accumulated dislodge and clog subsequent associated parts of the apparatus. The structure of the present invention has resulted in part from the discovery that a plurality of conveyors can be utilized to define a single unobstructed path while the individual conveyors are permitted to rise and fall in traversing uneven terrain.

Additionally, in the harvesting of potatoes, it has normally been necessary either to disk or to beat the vines with implements available for the purpose so as to cut or shred the vines and thus permit the subsequent harvesting of potatoes without congestion of the harvesting apparatus with the vines. The harvester of the instant invention obviates the need for such pre-disking or beating because of the unobstructed path provided and further because of certain aligning of the vines with their direction of movement through the harvester so as to facilitate their effective handling.

Accordingly, an object of the present invention is to provide a harvesting apparatus which accommodates elevations and depressions in earth traversed during operation.

Another object is to provide a harvester of the character described employing a plurality of contiguous conveyors individually provided with crop digging means and forming a continuous unobstructed path although individualy rising and falling in response to the traversal of elevations and depressions in the terrain of operation.

Another object is to provide a plant digging and elevating apparatus which is capable of harvesting a wide swath of plants with minimum injury thereto.

Another object is to provide a harvester for potatoes and the like which minimizes clogging and congestion by substantially aligning adherent vines with their direction of movement through the harvester.

Another object is to provide a harvester having edgewardly contiguous conveyors which are independently elevationally movable with respect to each other and which are carried in predetermined relation to the surface of earth traversed by individual gauge means supported on the soil in advance of the conveyors.

Another object is to permit the harvesting of potatoes and the like without preliminary removal or breaking up of the potato vines.

Another object is to improve the harvesting efficiency of potato diggers and the like.

Another object is to permit the harvesting of potatoes and the like under adverse conditions which normally preclude mechanical harvesting operation.

Other objects and advantages will become more fully apparent in the subsequent description in the specification.

Figure 1:
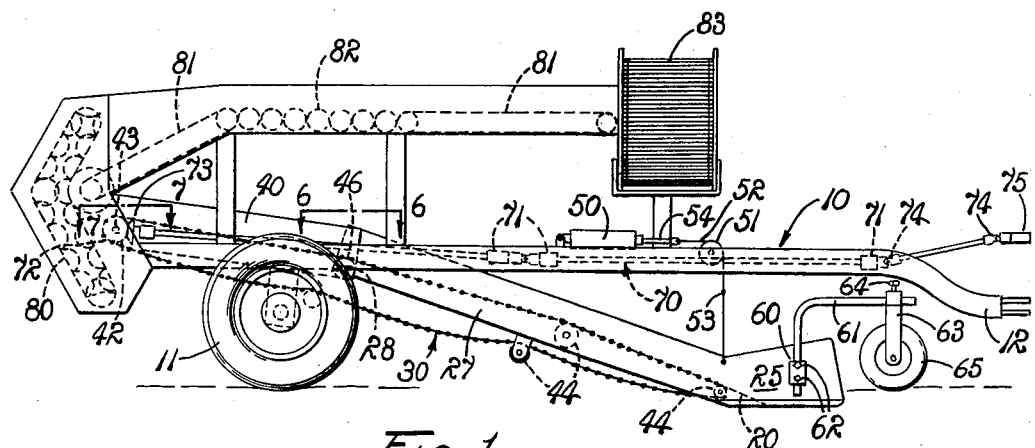
FIG. 1 is a view in side elevation of a harvester embodying the principles of the present invention.

A harvester is shown in FIG. 1 embodying the present invention as utilized in the harvesting of herbaceous plants, such as potatoes, beets, onions, and the like. However, since it was developed in the solution of certain potato harvesting problems, it will be described in such connection. The harvester includes a main frame 10 supported for earth traversing movement by a pair of ground wheels, one of which is shown at 11. In the illustrative embodiment, the apparatus is adapted to be drawn by a tractor or other prime mover, not shown, by means of a forwardly extended draft member 12. During the harvesting process, the potatoes are uprooted from the ground and taken into the machine for cleaning, devining, or other treatment and discharge at an elevated position. The edible portions are also separated from any earth clinging to them and then transferred to a temporary storage container on the harvester, or discharged into another vehicle, such as a truck, not shown, attending the harvester. The potatoes are shown at 14 and usually have their vines 15 adherent thereto when harvested without pre-beating or disking.

Figure 2:
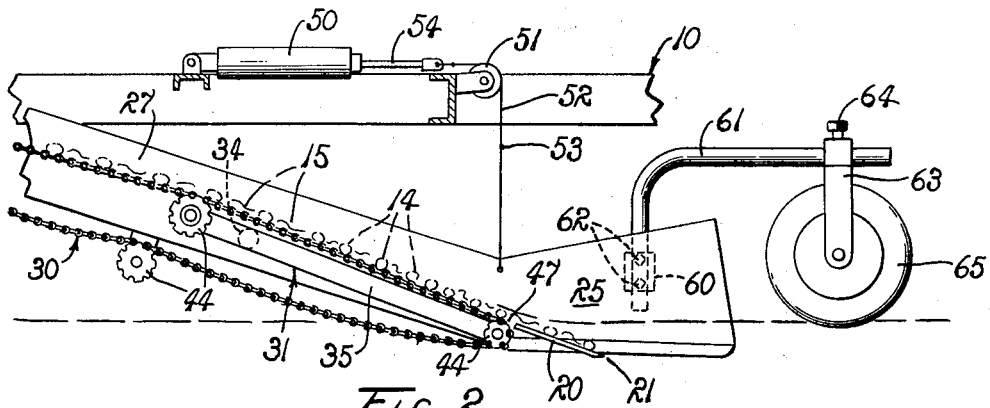
FIG. 2 is a fragmentary view in longitudinal vertical section of the harvester. This illustration can be visualized as being taken on line 2—2 of FIG. 4.
Figure 3:
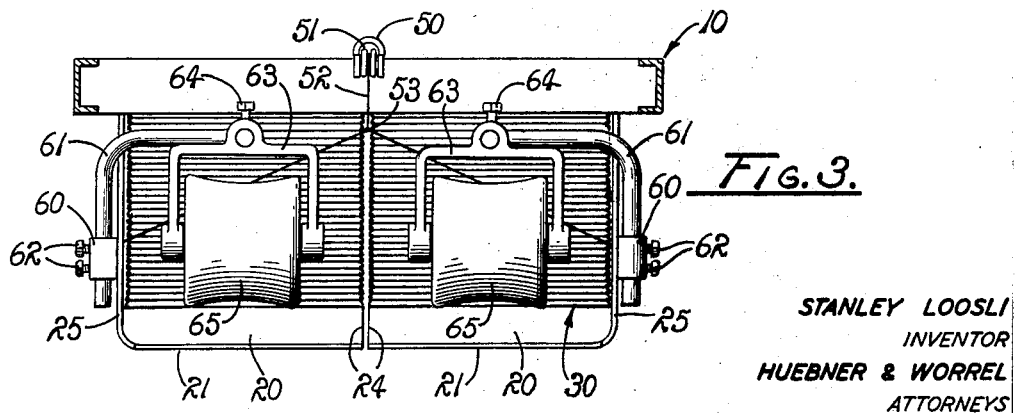
FIG. 3 is an enlarged fragmentary view in front elevation showing the digging and elevating apparatus of the present invention in greater detail.
Figure 4:
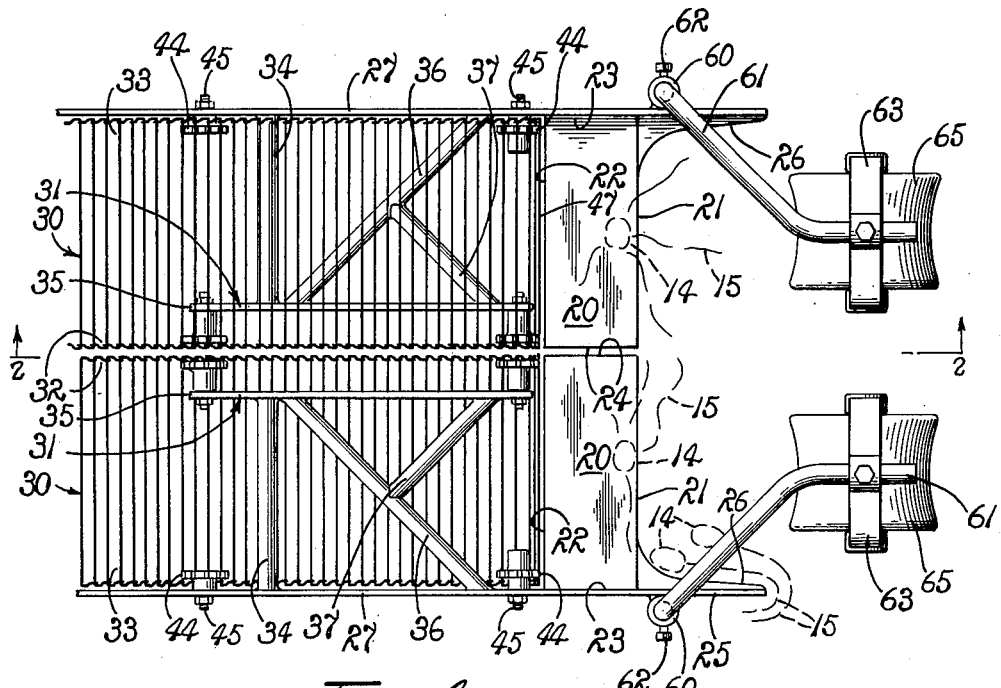
FIG. 4 is a fragmentary top plan view of the apparatus of FIG. 3, showing a pair of conveyors with the upper portion of the conveyor on the right with respect to the direction of travel of the apparatus removed for illustrative purposes.

To dig the potatoes from the earth, two earth engaging blades 20 are provided, each of which has leading, trailing, inner and outer edges 21, 22, 23, and 24, respectively. Each blade is rigidly secured at its outer edge to a respective supporting guide plate 25, as by welding. Each guide plate includes a lower edge 26 which is preferably inwardly directed toward a predetermined cutting swath defined by the transverse limits of the pair of blades 20 and is disposed in the plane of the leading edge 21 of the blade to which it is rigidly affixed. Said lower edge also is preferably arcuate, as shown in FIG. 4, to provide a continuous, concave cutting edge with the leading edge of its respective blade. The guide plates extend rearwardly to form rigid outer frame members 27. When the blades 20 are in earth engagement, they are rearwardly inclined, as best shown in FIG. 2. In this operable position, the lower edges 26 of the guide plates 25 are substantially horizontal but at the rearward ends of the guide plates the integral outer frame members 27 are rearwardly inclined in the frame. As evident in FIGS. 3 and 4, only two guide plates 25 and frame members 27 are employed and they are disposed in parallel spaced relation. A transverse shaft 28 is mounted in the frame 10 adjacent to the rear wheels 11 and the frame members 27 are pivotally mounted thereon, as by bearings 29. So mounted, the forward end portions of the frame members are elevationally pivotal to accommodate uneven terrain traversed and for controlled movement of the blades to and from operable position, as will hereinafter become more fully apparent.

Two contiguous conveyors 30 are provided rearwardly of the cutting blades individually aligned with their respective blades and are supported on the frame 10 for movement in circuitous paths in which the upper runs of the conveyors move in a rearward direction with respect to the forward direction of travel of the harvester under powered motivation, as will hereinafter be described. Each conveyor is supported at its forward end between the rigid outer frame member 27 and an inner frame member 31 mounted thereon and integral therewith. Each conveyor is of a width corresponding to the width of its respective blade 20 and has inner and outer edges, 32 and 33, respectively. It will be noted that the respective inner edges 32 of the conveyors are contiguous to preclude the loss of potatoes or other crop between the conveyors.

As best shown in FIGS. 2 and 4, the inner frame members 31 are rigidly individually mounted upon their respective outer frame members 27 and are disposed between the upper and lower runs of their respective conveyors. Thus, the upper runs of the conveyors 30 cooperatively provide an unobstructed path rearwardly and upwardly in the harvester, which path has opposite longitudinal halves consisting of the individual conveyors which can move independently up and down and which have nothing disposed between them which extends upwardly above the upper runs to constitute an obstruction for the collection of potatoes, soil, potato vines or debris in clogging relation to the path.

Each of the inner frame members 31 conveniently contended end of the strut in parallel relation to the outer frame member 27. An arm 35 is rigidly mounted on the extended end of the strut in parallel relation to the outer frame member. A brace 36 rigidly interconnects the juncture of the strut and the arm and the outer frame 27 forwardly thereof. A further brace 37 is connected to the forward end of the arm 35 and to the mid portion of the brace 36. The strut 34, arm 35, brace 36 and brace 37 are all rigid with the outer frame member 27 and are disposed between the upper and lower runs of their respective conveyor 30.

Figure 5:
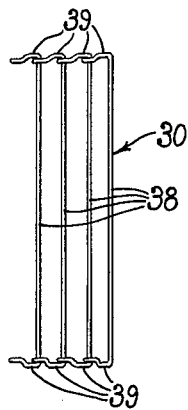
FIG. 5 is an enlarged plan view of a section of a conveyor illustrating a suitable form thereof.
Figure 6:
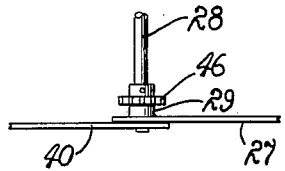
FIG. 6 is a fragmentary section taken on line 6—6 of FIG. 1.
Figure 7:
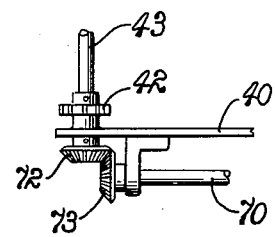
FIG. 7 is a fragmentary section taken on line 7—7 in FIG. 1.

While the conveyors may take any suitable form, they are preferably of an open framework type to permit soil and debris to fall therethrough. In the illustrative form shown in FIG. 5, each conveyor consists of a series of transversely extended longitudinally spaced bars 38 having opposite ends formed to provide links 39 which are connected to their adjacent bars. In effect, the interconnected links and bars at each of the side edges 32 and 33 of the conveyors form tension members between which the bars are extended. Such conveyors are well-known in the art and are illustrated in United States Patents Nos. 1,568,482 and 2,365,077.

The outer frame members 27 terminate rearwardly adjacent to the mounting shaft 28. An auxiliary outer frame member 40 is rigidly mounted in the frame 10 in outwardly overlapping relation to the rearward end of each outer frame member 27. The auxiliary frame members are parallel and constitute non-pivotal rearward extensions of the frame member 27. As will now be apparent, each guide plate 25, its frame member 27 and its auxiliary frame member 40 are formed of sheet or plate material and constitute a substantially erect crop confining wall.

A pair of drive sprockets 42 are provided at the rear ends of the auxiliary outer frame members 40 for each of the conveyors and engage the spaced bars 38 adjacent to the side edges 22 and 33 of their respective conveyors. The drive sprockets are mounted on a drive shaft 43 rotatably supported in the auxiliary frame members 40. The forward end of each of the coveyors is supported on a pair of idler sprockets 44 journaled on axially aligned stub shafts 45 inwardly extended from each of the inner and outer frame members 31 and 27. The idler sprockets also engage the bars 38 adjacent to the side edges 32 and 33 of their respective conveyors. The idler sprockets are so positioned that the forward end of each conveyor is located immediately to the rear of, and slightly below, the trailing edge 22 of its respective digging blade 20. Suitable intermediate idler sprockets 46 are provided on the inner and outer frame members as desired to support the upper runs of the conveyors.

To permit elevation of the forward ends 47 of the conveyors 30 along with their digging blades 20, as for transport, an hydraulic ram 50 is mounted on the frame 10 above the conveyors. It is to be understood that the ram is hydraulically extended and contracted by any suitable system, not shown. A sheave 51 is mounted in the frame above the forward ends of the conveyors. A cable 52 is connected to each of the outer frame members 27 interconnected at 53 above the inner edges 32 of the conveyors and extended over the sheave for connection to the piston rod 54 of the ram. By retraction of the ram, the cable 52 is tensioned responsively to elevate the forward ends of the conveyors and their blades. When the ram is extended, the conveyors and blades are lowered for operation by lowering the cable.

A vertical sleeve 60 is welded or otherwise secured outwardly against each of the guide plates 25. A bracket rod 61 is slidably fitted in each sleeve, upwardly extended therefrom, arcuately curved inwardly over its adjacent guide plate, and thence horizontally forwardly extended substantially centrally of its respectively adjacent conveyor 30. Setscrews 62 are screw-threadably engaged in the sleeves and are tightened against the bracket rod securely to hold the rod in adjusted elevational position with respect to the sleeve. A yoke 63 is mounted on the forward end of each rod 61 and is secured in adjusted position longitudinally thereof by a setscrew 64. A gauge wheel 65 is journaled in each of the brackets for rotation about an axis transversely of the forward direction of movement of the harvester. The gauge wheels are preferably concave to facilitate their rolling over crested rows of crops.

The conveyors 30 are motivated with their upper runs traveled upwardly in the frame by powered rotation of the drive sprockets 42 in a counterclockwise direction, as viewed in FIG. 1. The motivating power can be supplied in any manner desired but conveniently such a supply takes the form of a drive line 70 rotatably mounted on the frame by bearings 71 having driving connection to the drive shaft 43 through a pair of bevel gears 72 and 73. The drive line includes such universal joints 74 as are needed for extension to the front of the frame 10 at which point the line is provided with a drive coupling 75 adapted for connection to the power take-off of a tractor, not shown.

The rear end of the conveyors 30 may deliver to any associated structure or vehicle desired but in the embodiment illustrated discharges into an elevating conveyor 80. The elevating conveyor in turn delivers to a series of conveyors 81 including a section of transverse cleaning rollers 82 and discharges onto an elevated laterally extended conveyor 83. The conveyor 83 normally discharges into an attending truck or wagon, not shown. The conveyors 80, 81 and 83 constitute no essential part of the subject invention but form an illustrative operational environment conducive to a better understanding of the invention.

OPERATION

The operation of the described embodiment of the subject invention is believed to be readily apparent and is briefly summarized at this point. In preparation for harvest, the draft member 12 is connected to a suitable draft appliance, not shown, and the drive coupling 75 engaged with a power take-off of the draft appliance. To transport the harvester, the ram 50 is contracted to elevate the forward ends of the conveyors 30 and the blades 20 by drawing upwardly on the cable 52. This also elevates the guide plates 25 and the gauge wheels 65 from earth engagement.

The harvester is towed into a field having crops, such as potatoes, to be harvested and the conveyors 30 aligned with rows of the crop. The ram 50 is then extended to let out the cable 52 so that the forward ends of the outer frame member 27 and the guide plates 25 are lowered into earth engagement bringing the blades 20 likewise into earth engagement. The bracket rods 61 are adjusted in the sleeves 60 and held in place by the setscrews 62 so that the gauge wheels 65 support the blades 20 at a desired depth of earth engagement during forward movement. For potatoes, this depth is such that the forward edges 21 of the blades pass under the deepest potatoes so as to harvest the entire crop.

The power take-off of the draft appliance is then actuated so that the drive line 70 rotates the drive sprockets 42 so that the upper runs of the conveyors 30 are traveled rearwardly and upwardly in the frame 10. The harvester is then towed along the rows of crops. When potatoes or similar crops are being harvested, the upright forward edges of the guide plates 25 engage the vines and upon forward movement of the harvester the vines are drawn about said edges into substantial alignment with the direction of movement. Such vine aligning effect, of course, occurs only in those instances in which the vines engage the forward edges of the guide plates. The vines inwardly thereof need not be so aligned and are not. After engagement of the vines by the guide plates, the blades 20 uproot the potatoes and discharge them onto the forward ends of the conveyors 30.

When the potatoes 14 and vines 15 reach the conveyors 30, they are carried upwardly and rearwardly in the harvester for subsequent discharge by the conveyor 83 or other disposition, as desired.

During the digging operations, the gauge wheels 65 support their respective guide plates 25, forward ends of the outer frame members 27, blades 20, and forward ends of the conveyors 30, for independent elevational movement. Thus, if the contour of an individual row being harvested is elevated or depressed, the gauge wheel 65 rolling thereover correspondingly elevates or depresses and elevates or depresses its blade 20 and associated structure to insure proper digging and harvesting. This is a further significant feature of the subject invention which, for the first time, permits a plurality of rows of such crops to be concurrently harvested with due regard to individual variations in the elevations of the rows harvested.

A still further feature of the instant invention is the provision by the blades 20 and the conveyors 30 of a common unobstructed path for movement rearwardly and upwardly of the harvested crops. This is made possible by mounting the blades and conveyors with their inner edges 24 and 32, respectively, in contiguous relation with no frame or other structure extended upwardly therebetween as has previously been thought necessary in order to mount such blades and conveyors for operation. The mounting of the inner frame members 31 rigidly on the outer frame members 27 and extending them inwardly between the upper and lower runs of the conveyors makes possible the mounting of the idler sprockets 44 so as to provide support for the conveyors without the interposition of frame structure between the contiguous blades and conveyors.

As the blades 20 and the forward ends of the conveyors 30 independently rise and fall under the control of their respective gauge wheels 65, the contiguous relation of the inner edges 24 and 32 thereof preclude any significant loss of crops therebetween. The extent of variations in the elevation of terrain traversed in a field of such crops is normally not in excess of a few inches. Where the raising and lowering of the cutting edges 21 of the blades 20 a few inches can make the difference between properly harvesting potatoes or slicing them in two, the range of relative elevational movement of the blades and conveyors in operation is such that virtually no loss occurs between the contiguous edges. Further, in the harvesting of potatoes, the vines 15 are entangled centrally of the unobstructed path over said inner edges and further insure against loss of potatoes between said inner edges by their holding effect.

The described harvester is adapted to harvest a wide swath of crops with a minimum of injury thereto. It minimizes clogging and congestion to such an extent by the avoidance of all obstructions between the blades and between the conveyors, that it can be operated under conditions which preclude the operation of conventional harvesters for such crops. For example, the harvester of the present invention can harvest effectively where the ground is so moist that it clogs conventional harvesters and can likewise harvest effectively in fields in which grass or other turf or vines have become so proliferate so as to entangle conventional harvesters.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A harvester comprising a mobile frame having predetermined forward and rearward end portions, a plurality of elongated conveyors positioned longitudinally in the frame in laterally contiguous relation having adjacent inner edges, opposite outer edges, forward end portions adjacent to the ground and upwardly extended rearward end portions, means mounting said conveyors in the frame for elevational movement of the forward end portions thereof independently of each other, crop harvesting blades individual to the conveyors mounted on the mounting means of their respective conveyors at the forward end portions thereof for unitary elevational movement therewith, and depth control means individual to the conveyors mounted on the mounting means of their respective conveyors at the forward end portions thereof in ground engagement for corresponding elevational movement of the depth control means and their respective conveyors and blades in a response to the terrain traversed by said depth control means, said conveyors having spaced upper and lower runs and the mounting means therefor being extended between said upper and lower runs, and said mounting means at all positions between the outer edges of the conveyors being below the upper runs of the conveyors so that said upper runs provide a common unobstructed path longitudinally of the frame.

2. The harvester of claim 1 having vine guides borne by the mounting means and forwardly extended adjacent to said opposite outer edges of the conveyors and presenting forwardly disposed edges in forwardly spaced relation to the blades about which vines are drawn during earth traversing movement into substantial alignment with said movement prior to being uprooted by the blades.

3. A harvester for rooted plants having vines disposed above the ground comprising a frame mounted for earth traversing movement and having predetermined forward and rearward end portions; a pair of substantially parallel elongated outer frame members positioned longitudinally in the frame having forward and rearward end portions; means pivotally mounting the outer frame members in the frame for independent elevational movement of the forward end portions thereof about a common axis transversely of the frame; inner frame members rigidly mounted on the forward end portions of the outer frame members and inwardly extended therefrom for unitary elevational movement with their respective outer frame members independently of each other; a pair of endless conveyors; means individually mounting the conveyors on the outer frame members and their respective inner frame members in circumscribing relation to their respective inner frame members with said conveyors having rearwardly inclined upper runs providing a common unobstructed path rearwardly in the frame; powered means having driving connection to the conveyors motivating the conveyors with their upper runs traveled rearwardly in the frame at substantially the same velocity; and crop digging blades individual to the conveyors mounted on the forward ends of the outer frame members and inwardly extended therefrom forwardly of their respective conveyors adapted to uproot plants and to discharge them onto their respective conveyors.

4. A harvester for rooted plants having vines disposed above the ground comprising a frame mounted for earth traversing movement and having predetermined forward and rearward end portions; a pair of substantially parallel elongated outer frame members positioned longitudinally in the frame having forward and rearward end portions; means pivotally mounting the outer frame members in the frame for independent elevational movement of the forward end portions thereof about a common axis transversely of the frame; inner members rigidly mounted on the forward end portions of the outer frame members and inwardly extended therefrom for unitary elevational movement with their respective outer frame members; a pair of endless conveyors; means individually mounting the conveyors on the outer frame members and their respective inner frame members in circumscribing relation to their respective inner frame members with said conveyors having rearwardly inclined upper runs providing a common unobstructed path rearwardly in the frame; powered means having driving connection to the conveyors motivating the conveyors with their upper runs traveled rearwardly in the frame; crop digging blades individual to the conveyors mounted on the forward ends of the outer frame members and inwardly extended therefrom forwardly of their respective conveyors adapted to uproot plants and to discharge them onto their respective conveyors; and vine guides integral with the outer frame members and forwardly extended therefrom in substantial alignment therewith presenting substantially upright forwardly disposed edges in forwardly spaced relation to the blades about which vines are drawn during earth traversing movement into substantial alignment with said movement prior to being uprooted by the blades.

5. A harvester for rooted plants having vines disposed above the ground comprising a frame mounted for earth traversing movement and having predetermined forward and rearward end portions; a pair of substantially parallel elongated outer frame members positioned longitudinally in the frame having forward and rearward end portions; means pivotally mounting the outer frame members in the frame for elevational movement of the forward end portions thereof about a common axis transversely of the frame independently of each other; inner frame members rigidly mounted on the forward end portions of the outer frame members and inwardly extended therefrom for unitary elevational movement with their respective outer frame members; a pair of endless conveyors; means individually mounting the conveyors on the outer frame members and their respective inner frame members in circumscribing relation to their respective inner frame members with said conveyors having rearwardly inclined upper runs providing a common unobstructed path rearwardly in the frame; a pair of digging blades individually mounted on said outer frame members in forwardly extended relation from their respective conveyors so as to uproot plants and to discharge them rearwardly onto the conveyors during said forward movement of the harvester; and independent depth control means individually mounted on said outer frame members and disposed forwardly of their respective conveyors for controlling said elevational movement of their respective conveyors and blades in response to the terrain traversed.

6. A harvester, adapted for earth traversing movement in a predetermined forward direction of travel longitudinally along rows of plants, comprising a frame having a pair of outer frame members providing forward and rearward end portions with the rearward end portions being pivotally mounted on the frame for elevational movement of the forward end portions thereof independently of each other and with said outer frame members disposed in transversely spaced relation to receive a pair of adjacent rows of plants; a pair of elongated conveyors disposed longitudinally within the frame in individual alignment with said adjacent plant rows providing forward end portions adjacent to the ground, upwardly extended rearward end portions, inner edges and upper and lower runs; a pair of support members individually mounting said conveyors within the frame on said outer frame members for independent elevational movement of the forward end portions of the conveyors with their respective outer frame members, said support members including a pair of inner frame members individually disposed between the upper and lower runs of their respective conveyors and terminating adjacent to the edges of their respective conveyors between the upper and lower runs thereof to permit the edges to be disposed in coextensive adjacent relation so as to form a common substantially continuous uninterrupted conveying surface transversely of the conveyors between said outer frame members; a pair of digging blades individually mounted on said outer frame members in forwardly extended relation from their respective conveyors so as to uproot plants and to discharge them rearwardly onto the conveyors during said forward movement of the harvester; and independent depth control means mounted on said outer frame members individual to the conveyors and disposed forwardly thereof for controlling said elevational movement of their respective conveyors and blades in response to the terrain traversed.

7. The harvester of claim 6 having vine guides mounted on the outer frame members and forwardly extended therefrom presenting forwardly disposed edges in forwardly spaced relation to the blades about which vines are drawn during earth traversing movement into substantial alignment with said movement prior to being uprooted by the blades.

References Cited by the Examiner
UNITED STATES PATENTS

| | | | |
|---|---|---|---|
| 2,081,346 | 5/1937 | Altgelt | 171—126 X |
| 2,544,744 | 3/1951 | Young | 171—126 |
| 3,005,498 | 10/1961 | Huddle | 171—109 |

ABRAHAM G. STONE, *Primary Examiner.*

T. GRAHAM CRAVER, ANTONIO F. GUIDA, *Examiners.*